(12) United States Patent
Lau et al.

(10) Patent No.: US 9,418,229 B2
(45) Date of Patent: Aug. 16, 2016

(54) FIRMWARE SECURITY

(71) Applicant: Disney Enterprises, Inc., Burbank, CA (US)

(72) Inventors: Gary K. Lau, SeaTac, WA (US); Gregory J. Strange, Mercer Island, WA (US); Derek Simkowiak, Lynnwood, WA (US)

(73) Assignee: Disney Enterprises, Inc., Burbank, CA (US)

( * ) Notice: Subject to any disclaimer, the term of this patent is extended or adjusted under 35 U.S.C. 154(b) by 0 days.

(21) Appl. No.: 14/525,318

(22) Filed: Oct. 28, 2014

(65) Prior Publication Data
US 2015/0121070 A1  Apr. 30, 2015

Related U.S. Application Data

(60) Provisional application No. 61/896,518, filed on Oct. 28, 2013.

(51) Int. Cl.
*G06F 21/57*   (2013.01)
*H04L 29/06*   (2006.01)
*G06F 9/445*   (2006.01)

(52) U.S. Cl.
CPC ............ *G06F 21/572* (2013.01); *G06F 8/65* (2013.01); *G06F 8/665* (2013.01); *H04L 63/0428* (2013.01); *H04L 63/0807* (2013.01); *H04L 63/0823* (2013.01)

(58) Field of Classification Search
CPC .................. G06F 21/572; H04L 63/0428
USPC ......... 713/164, 163, 165, 188, 176, 189, 178; 717/168, 171; 726/2, 4, 5
See application file for complete search history.

(56) References Cited

U.S. PATENT DOCUMENTS

| | | | | |
|---|---|---|---|---|
| 2003/0061170 | A1* | 3/2003 | Uzo | G06Q 20/06 705/64 |
| 2007/0028120 | A1* | 2/2007 | Wysocki | G06F 21/10 713/192 |
| 2010/0257345 | A1* | 10/2010 | Tazzari | G06F 8/665 713/1 |

OTHER PUBLICATIONS

"Bootloader with AES Encryption"—Silicon Laws, Aug. 2013 https://www.silabs.com/Support%20Documents/TechnicalDocs/AN0060.pdf.*

* cited by examiner

*Primary Examiner* — Randy Scott
(74) *Attorney, Agent, or Firm* — Patterson + Sheridan, LLP

(57) ABSTRACT

One embodiment provides an apparatus adapted to perform a secure firmware upgrade. The apparatus includes a first memory and a second memory. The first memory stores a private key for use in decrypting content and a unique identifier corresponding to the apparatus. The second memory includes a first version of firmware for the apparatus. The apparatus further includes a controller configured to perform an operation that includes receiving a first request to perform a firmware update operation for the apparatus. The operation also includes transmitting a second request for a second version of firmware to a remote server, the second request specifying the unique identifier corresponding to the apparatus. Additionally, in response to transmitting the second request, an encrypted firmware package is received from the remote server. The operation further includes decrypting the encrypted firmware package using the private key and installing the decrypted firmware package on the apparatus.

18 Claims, 5 Drawing Sheets

FIRMWARE SECURITY

CROSS-REFERENCE TO RELATED APPLICATIONS

This application claims benefit of U.S. provisional patent application Ser. No. 61/896,518, filed Oct. 28, 2013, which is herein incorporated by reference in its entirety.

BACKGROUND

1. Field of the Invention

The present invention generally relates to home entertainment, and more specifically to techniques for providing security for firmware updates to devices.

2. Description of the Related Art

Computer graphics technology has come a long way since video games were first developed. Relatively inexpensive 3D graphics engines now provide nearly photo-realistic interactive game play on hand-held video game, home video game and personal computer hardware platforms costing only a few hundred dollars. These video game systems typically include a hand-held controller, game controller, or, in the case of a hand-held video game platform, an integrated controller. A user interacts with the controller to send commands or other instructions to the video game system to control a video game or other simulation. For example, the controller may include a joystick and buttons operated by the user.

While video games allow the user to interact directly with the video game system, such interactions primarily influence the graphical depiction shown on the video game device (or on a connected display), and rarely influence any other objects outside of the virtual world. That is, a user may specify an input to the video game system, indicating that the user's avatar should perform a jump action, and in response the video game system could display the user's avatar jumping. However, such interactions are typically limited to the virtual world, and any interactions outside the virtual world are limited (e.g., a hand-held gaming device could vibrate when certain actions occur).

Additionally, many hand-held gaming devices include some form of camera device which may be used to capture an image or a series of images of a physical, real-world scene. The captured images can then be displayed, for instance, on a display of the hand-held gaming device. Certain devices may be configured to insert virtual objects into the captured images before the images are displayed. Additionally, other devices or applications may enable users to draw or paint particular within a captured image of a physical scene. However, as such alterations apply only to a single image of the physical scene, subsequent captured images of the physical scene from different perspectives may not incorporate the user's alterations.

Many electronic and computing devices include some form of firmware, which generally represents computer program code (and data) stored in a portion of persistent memory. In some devices, the firmware is stored such that the firmware cannot be changed throughout the lifetime of the device (e.g., stored in Read-Only Memory (ROM)). While doing so provides enhanced firmware security in terms of preventing third-party firmware and potentially malicious firmware from being installed on the device, it also prevents updates from the developers of the device that can be used to fix problems with the firmware, add new features, and so on. Additionally, modules exist to ensure that only authorized firmware is running on a processor, such as a Trusted Platform Module (TPM) secure cryptoprocessor. However, such hardware modules have a substantial monetary cost, which can make them ill-suited for particular products.

SUMMARY

One embodiment provides an apparatus that includes a first memory, a second memory and a controller. The first memory includes a private key for use in decrypting content and a unique identifier corresponding to the apparatus. The second memory includes a first version of firmware for the apparatus. The controller is generally configured to perform an operation that includes receiving a first request to perform a firmware update operation for the apparatus. The operation further includes transmitting a second request for a second version of firmware to a remote server, the second request specifying the unique identifier corresponding to the apparatus. Additionally, the operation includes, in response to transmitting the second request, receiving an encrypted firmware package from the remote server. The operation also includes decrypting the encrypted firmware package using the private key and installing the decrypted firmware package on the apparatus.

Another embodiment provides a system that includes a processor and a memory containing a program that, when executed by the processor, performs an operation. The operation includes receiving a request to add a first device to a device registry, the request specifying (i) a unique identifier corresponding to the first device and (ii) a key for use in encrypting data relating to the first device. The operation also includes adding the unique identifier and key for the first device to the device registry. Additionally, the operation includes receiving, from the first device, a request for an updated firmware package, the request specifying the unique identifier corresponding to the first device. The operation further includes retrieving the key by accessing the device registry using the unique identifier. Moreover, the operation includes encrypting a firmware package using the retrieved key and transmitting the encrypted firmware package to the first device for installation.

Yet another embodiment provides a method that includes generating a public key and a private key for a first device. The method further includes generating a unique identifier corresponding to the first device. Additionally, the method includes storing the generated private key onto a first memory of the first device. The method also includes storing the generated unique identifier corresponding to the first device onto a second memory of the first device. Moreover, the method includes transmitting a request to add the first device to a device registry to a remote server, the request specifying (i) the unique identifier and (ii) the generated public key. In addition, the method includes installing control logic on the first device configured to retrieve a private key stored in the first memory, decrypt a firmware package received from the remote server, using the retrieved private key, and install the decrypted firmware package on the first device.

BRIEF DESCRIPTION OF THE DRAWINGS

So that the manner in which the above recited aspects are attained and can be understood in detail, a more particular description of embodiments of the invention, briefly summarized above, may be had by reference to the appended drawings.

It is to be noted, however, that the appended drawings illustrate only typical embodiments of this invention and are therefore not to be considered limiting of its scope, for the invention may admit to other equally effective embodiments.

DETAILED DESCRIPTION

Embodiments generally provide techniques for protection from running unauthorized firmware on a device. For instance, embodiments can use a device-specific token or key to verify a source of a firmware package, and can perform a corrective action upon determining that the firmware package is not authorized (e.g., installing a default firmware package on the device). Generally, a device-specific piece of information (e.g., a generated unique token, a key, etc.) is written to each device (e.g., at the time of manufacture). Additionally, this device-specific piece of information can be transmitted, along with a unique identifier for the device (e.g., an identification number or code unique to the device), to a server system that maintains a repository of authorized firmware packages for the device. When the server system subsequently sends a firmware package for installation on the device, the server system could embed the device-specific information within the firmware package. A bootloader of the device could then check the information embedded in the firmware package with the information written on the device in order to determine whether the firmware package is an authorized firmware package. For example, the bootloader could determine the firmware package is authorized if the tokens match, and otherwise could determine that the firmware is an unauthorized firmware package.

Figure 1:
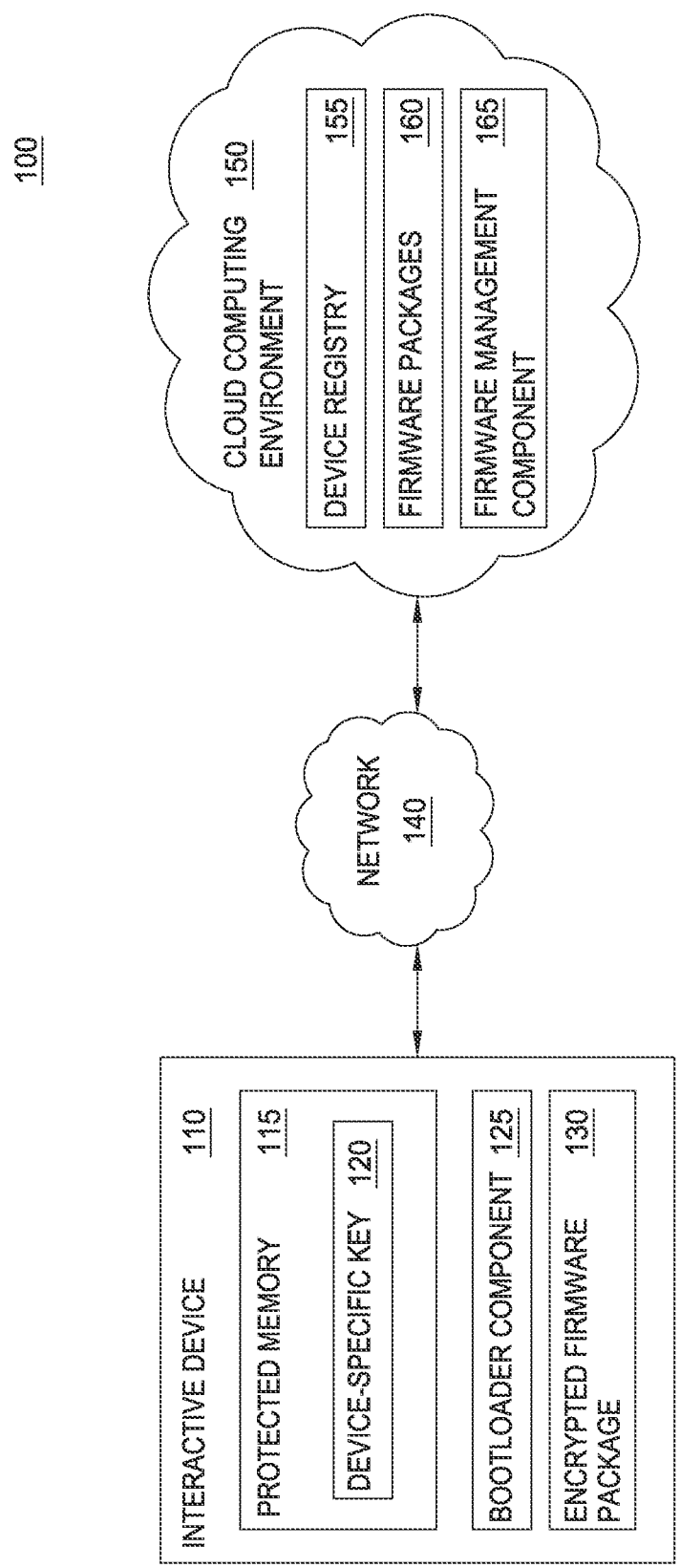
FIG. 1 illustrates a system including a firmware management component, according to one embodiment described herein.

An example of this is shown in FIG. 1, which illustrates a system including a firmware management component, according to one embodiment described herein. As shown, the system 100 includes an interactive device 110 and a cloud computing environment 150, connected via a network 140 (e.g., the Internet). The interactive device 110 includes protected memory 115, a bootloader component 125 and an encrypted firmware package 130. Protected memory 115 represents a read-only portion of memory within the interactive device 110.

The cloud computing environment 150 includes a device registry 155, firmware packages 160 and a firmware management component 165. While the depicted system 100 illustrates the firmware management component 165, the registry 155 and packages 160 deployed within a cloud computing environment, such a depiction is for illustrative purposes only. More generally, the firmware management component 165, the registry 155 and packages 160 can reside within any remote server(s) capable of communicating with the interactive device 110 or a controller configured to manage firmware updates for the interactive device 110.

Generally, cloud computing refers to the provision of scalable computing resources as a service over a network. More formally, cloud computing may be defined as a computing capability that provides an abstraction between the computing resource and its underlying technical architecture (e.g., servers, storage, networks), enabling convenient, on-demand network access to a shared pool of configurable computing resources that can be rapidly provisioned and released with minimal management effort or service provider interaction. Thus, cloud computing allows a user to access virtual computing resources (e.g., storage, data, applications, and even complete virtualized computing systems) in "the cloud," without regard for the underlying physical systems (or locations of those systems) used to provide the computing resources. Typically, cloud computing resources are provided to a user on a pay-per-use basis, where users are charged only for the computing resources actually used (e.g., an amount of storage space consumed by a user or a number of virtualized systems instantiated by the user). A user can access any of the resources that reside in the cloud at any time, and from anywhere across the Internet.

As discussed above, one embodiment provides a firmware package embedded with a token, and the bootloader component 125 of the device 110 can compare the embedded token with a previously written token on the device (e.g., written to the protected memory 115 of the device at the time of manufacture) to determine whether the firmware package is authorized for installation on the device. If the tokens do not match, the bootloader component 125 could install a factory default firmware image (e.g., also stored within protected memory 115) on the device, rather than the current firmware package.

In the embodiment depicted in system 100, however, the device 110 contains a device-specific key 120 within the protected memory 115. The protected memory 115 represents a portion of memory that is unaccessible by applications running on the device 110 and is only accessible to the bootloader 125. As used herein, a key refers to data (e.g., a sequence of numbers) that can be used to decrypt encrypted data (e.g., using asymmetric cryptography techniques, symmetric cryptography technique, etc.). Generally speaking, a number of different cryptography techniques exist. Examples of such techniques include, without limitation, Advanced Encryption Standard (AES) encryption, Data Encryption Standard (DES) encryption, Elliptic Curve Cryptography (ECC), Rivest-Shamir-Adleman (RSA) encryption, the Cramer-Shoup system, the Diffie-Hellman key exchange protocol, and so on. However, the present disclosure is not limited to any particular cryptographic technique, and more generally any known (or unknown) technique for encrypting and decrypting data can be used, consistent with the functionality described herein.

The device-specific key 120 could be written to the device, e.g., at the time the device was manufactured. Additionally, the manufacturer could have transmitted the device-specific key 120 (or, in an embodiment using asymmetric encryption techniques, a corresponding public key), along with a unique identifier for the device, to the firmware management component 165 within the cloud computing environment 150. The firmware management component 165, upon receiving the key 120 (or the corresponding public key) and the unique identifier, could update the device registry 155 with this information. Generally, the device registry 155 represents a mapping of unique device identifiers to device-specific keys (or corresponding public keys) across all devices managed by the firmware management component 165.

At some subsequent point in time, a request is transmitted to the firmware management component 165 to install one of the firmware packages 160 on the device 110. Such a request can also specify the unique identifier of the device on which the firmware package is to be installed. Here, the device 110 could manage its own firmware updates, or a controller component could be configured to manage firmware updates for the device 110. Upon receiving the request, the firmware management component 165 could retrieve the key corresponding to the unique device identifier specified within the request from the device registry 155, and could encrypt the requested firmware package 160 using the retrieved key. The encrypted firmware package could then be transmitted to the interactive device 110 (e.g., using network 140). In the depicted embodiment, this transmission has already occurred, as represented by the encrypted firmware package 130 on the interactive device 110.

Upon receiving the encrypted firmware package 130, the device 110 could proceed to install the firmware package. Such a process may be initiated by the device 110 itself or by a controller component configured to manage the firmware updates of the device 110. As part of such an installation process, the device 110 could restart. At this point, the bootloader component 125 could decrypt the encrypted firmware package 130 using the device-specific key 120 previously written to the protected memory 115, in order to recover the decrypted firmware package. The bootloader component 125 could then install the decrypted firmware package on the device 110. Doing so prevents unauthorized firmware packages from being installed on the device 110, as third parties are unable to retrieve the device-specific key 120 from protected memory 115, and thus are unable to encrypt the unauthorized firmware packages with the device-specific key 120 (or corresponding public key).

Figure 2:
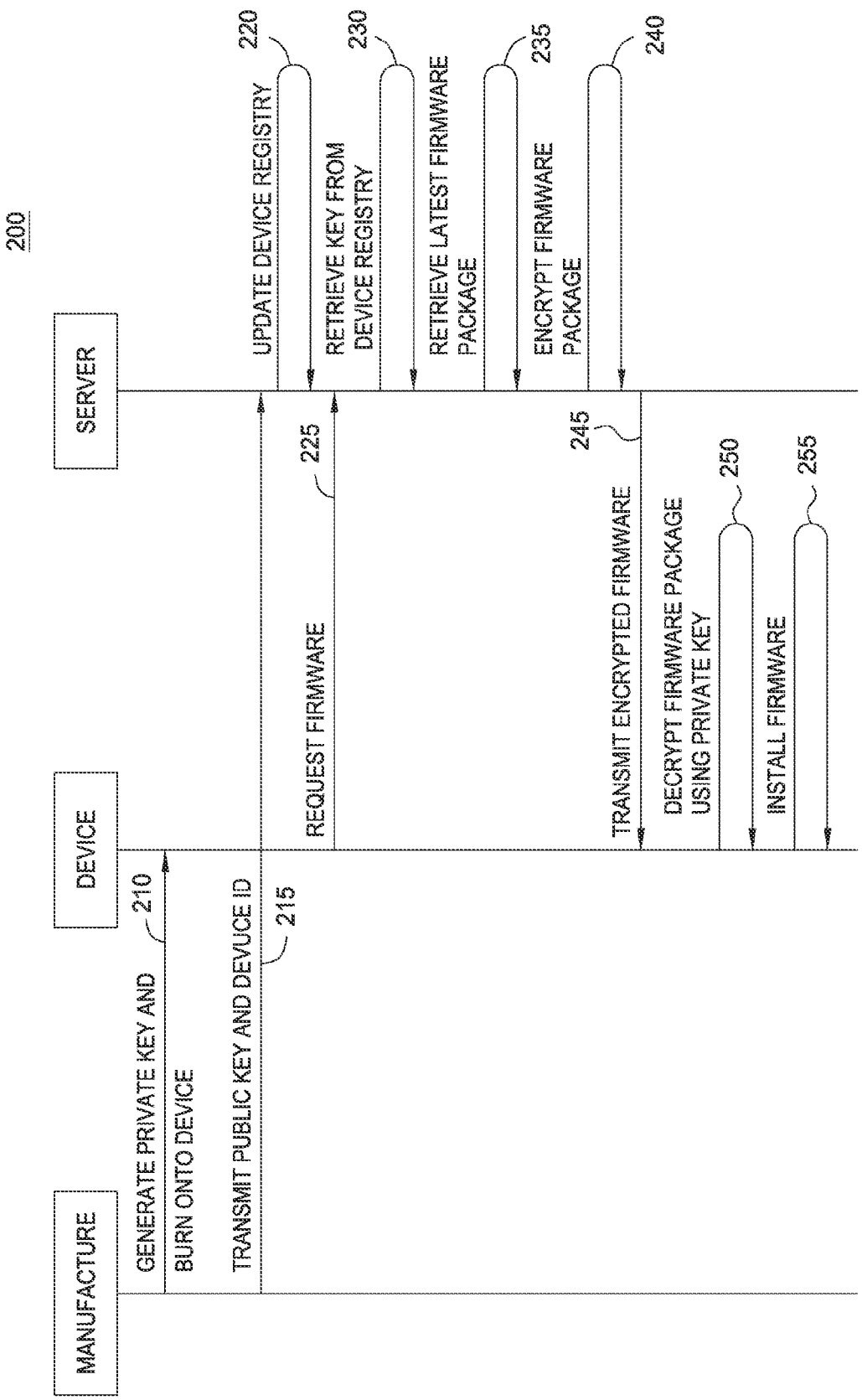
FIG. 2 is a flow diagram illustrating a method for verifying firmware on a device using a key, according to one embodiment described herein.

FIG. 2 is a flow diagram illustrating a method for verifying firmware on a device using a key, according to one embodiment described herein. As shown, the method 200 begins at block 210, where a manufacturer generates a private key and burns the private key onto the device. Here, the private key can be written to protected memory within the device, such that the private key can only be accessed by a bootloader of the device. For instance, such a memory could be a read-only memory (ROM) that is inaccessible by applications executing on the device and only accessible by the bootloader of the device. Doing so prevents applications and scripts executing on the device from accessing the private key.

Additionally, the manufacturer generates a public key corresponding to the private key, and transmits the public key along with a unique device identifier (ID) for the device to a server system (block 215). Generally, any asymmetric cryptography operation can be used in generating the public and private keys. Upon receiving the public key and device ID, the server system updates a device registry to include this information (block 220). For example, the device registry may comprise a mapping of device IDs to corresponding keys.

At some later point in time, logic on the device requests a firmware update from the server system (block 225). For purposes of this example, assume that such a request specifies the unique device ID for the device. In one embodiment, the logic on the device is configured to transmit a request across a network (e.g., the Internet) requesting to download the firmware update from the server system.

In response to the request, the server system uses the device ID to retrieve key corresponding to the device from the device registry (block 230), and also retrieves a latest version of a firmware package for the device (block 235). The server system then encrypts the firmware package using the retrieved key (block 240). While the depicted embodiment involves an asymmetric encryption technique, generally any technique capable of encrypting and decrypting data may be used, consistent with the functionality described herein.

Returning to the depicted method, an application executing on the server system transmits the encrypted firmware package to the device (block 245). For example, the application could be a web application hosted on a web server running on the server system. More generally, any server application can be used, consistent with the functionality described herein.

Upon receiving the encrypted firmware package, logic on the device decrypts the encrypted data to recover the firmware package, using the private key written to the protected memory of the device by the manufacturer (block 250). In one embodiment, where the protected memory is only accessible to the bootloader of the device, the bootloader retrieves the private key from the protected memory and decrypts the firmware package using the retrieved key. The logic on the device then installs the firmware package (block 255). For example, the bootloader of the application could initiate the installation of the decrypted firmware package. Advantageously, doing so prevents the installation of unauthorized firmware packages on the device, as unauthorized parties are unable to encrypt firmware packages such that the packages can be decrypting using the private key stored on the device.

Figure 3:
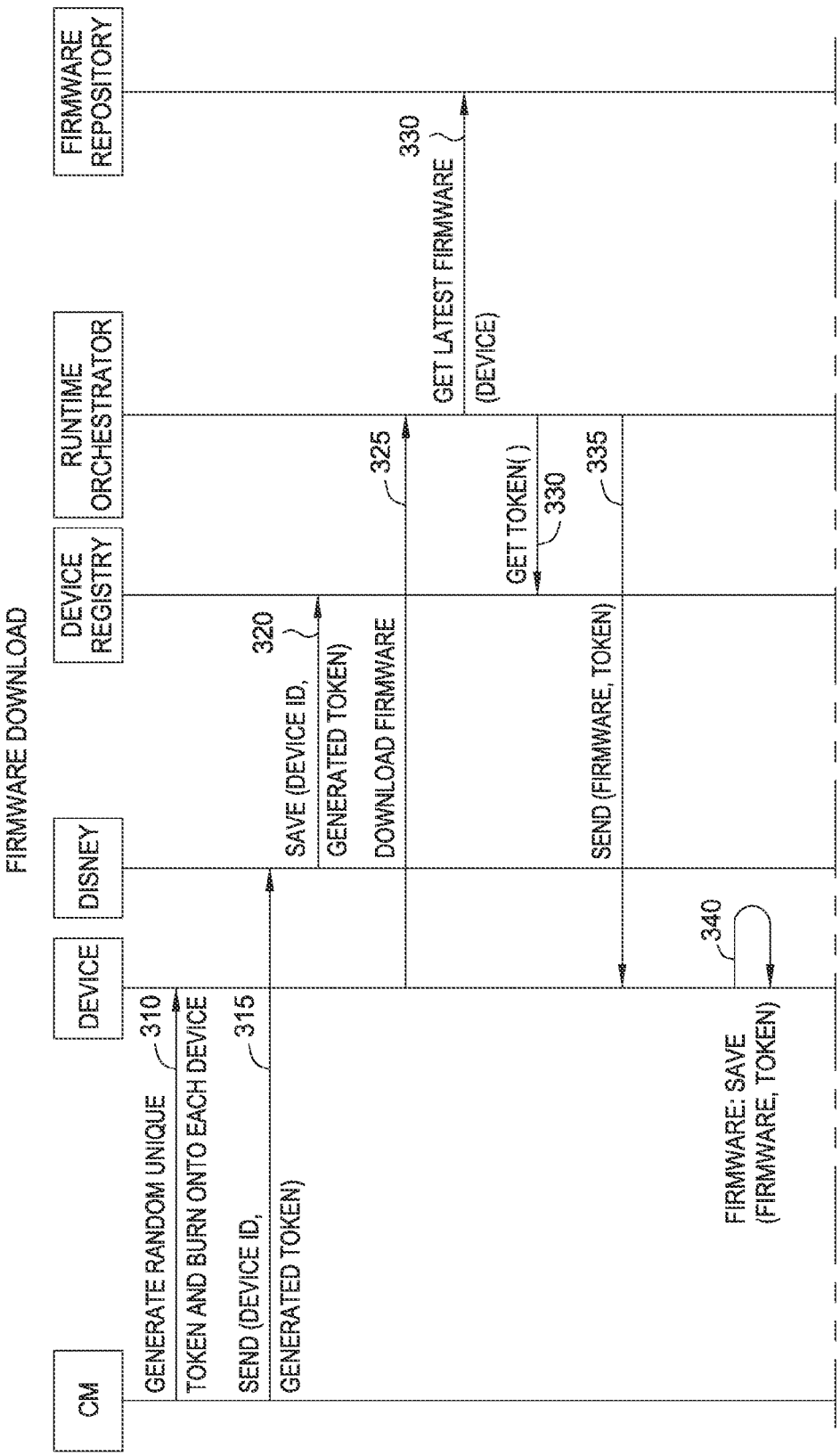
FIG. 3 is a flow diagram illustrating a method for deploying firmware on a device using a token, according to one embodiment described herein.

FIG. 3 is a flow diagram illustrating a method for deploying firmware on a device using a token, according to one embodiment described herein. As shown, the method 300 begins at block 310, where logic (e.g., a software application, a controller, etc.) for a manufacturer generates a random unique token and embeds the token onto the device. Generally, the token represents any data (e.g., a string of characters) that is preferably unique to the device across all of the devices of a given type. For example, for a particular type of interactive toy device, each toy device could be assigned a token comprising a unique alphanumeric string of characters and having a fixed length. Of note, while the token is generated and burned onto each device by a manufacturer in the depicted embodiment, more generally any technique for pre-configuring the device with the token can be used, consistent with the present disclosure. In one embodiment, the token is embedded such that it is stored in protected memory (e.g., a read-only memory that is only accessible by the bootloader) and cannot be read by programs executing on the device.

Additionally, the logic for the manufacturer sends the token, along with a unique identifier for the device (e.g., a device ID), to a server system (block 315). While the server system is represented as a Disney®-managed server system in the depicted embodiment, one of ordinary skill in the art will understand that the techniques described herein can be practiced with any server system capable of performing the functions described herein. In addition to transmitting the token and unique identifier to the server system, the manufacturer logic can send a generated public key to the server system, as discussed above with respect to FIG. 2. Upon receiving the unique token and the device ID, the server system saves the token and device ID into the device registry (block 320). For example, the device registry could index the token and the public key for a given device based on the device ID provided for the device, such that the token and public key can be subsequently retrieved using the device ID (e.g., using a hashing data structure).

At some later point in time, logic on the device (e.g., a software application executing on the device) sends a request to download a firmware package from a runtime orchestrator (block 325). As discussed above, logic on the device can be configured to directly request and download the firmware (e.g., over the Internet using a network connection of the device), or a controller (e.g., a separate computing system configured to manage firmware updates on the device) can request and download the firmware package for installation onto the device. More generally, any technique for requesting the firmware from the server system and transferring the firmware package to the device can be used, consistent with the present disclosure.

In response to the request, the runtime orchestrator at the server system retrieves a latest version of the firmware for the device (block 330). In one embodiment, the runtime orchestrator represents a web application hosted using a web application server and web server, and configured to receive and process requests to download firmware packages. For example, the runtime orchestrator could access data that specifies a location of a file corresponding to the latest version of the firmware. In a particular embodiment, the runtime orchestrator can receive the device ID of the device as part of the firmware request and can use the device ID to determine a type of the device. As another example, the firmware download request could specify the type of the device (e.g., in addition to or in lieu of the device ID). The runtime orchestrator could then use the device type information to determine the latest version of firmware to retrieve. For example, where the runtime orchestrator supports multiple different types of devices, the runtime orchestrator could maintain a separate version of firmware for each of the different types of devices, and can select one of these firmware packages based on the particular device's type.

Additionally, the runtime orchestrator retrieves the device-specific token for the device from the device registry (block 333). For example, the request transmitted at block 325 could specify the device's unique ID, and the runtime orchestrator could use the unique ID to retrieve the corresponding token from the device registry. Once the token is retrieved, the runtime orchestrator transmits the firmware package along with the token to the device. Upon receiving the firmware package and the token, the device saves this information to memory on the device (block 340), and the method 300 ends. In one embodiment, the runtime orchestrator is further configured to retrieve a previously stored public key from the device registry and to encrypt the firmware package using the public key, before transmitting the firmware to the device.

Figure 4:
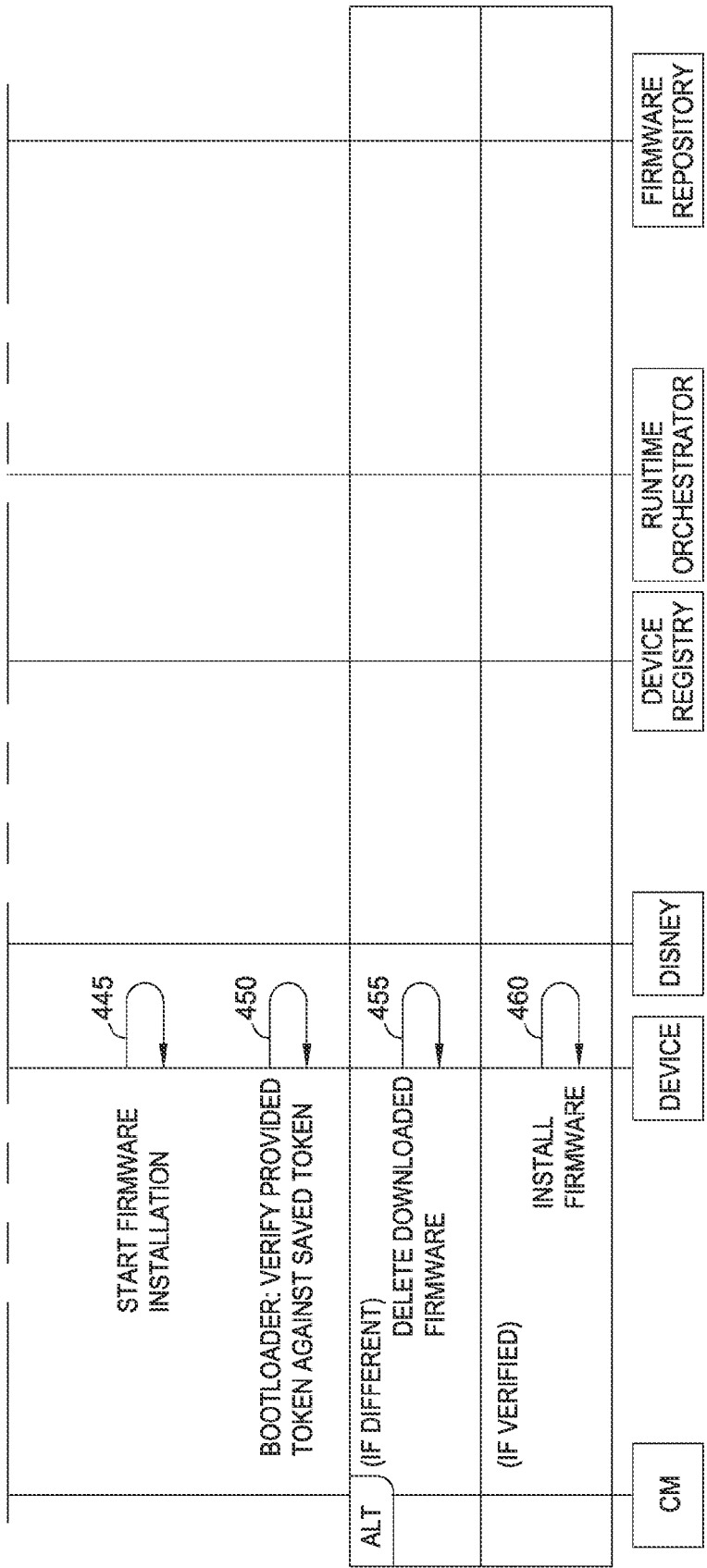
FIG. 4 is a flow diagram illustrating a method for verifying firmware on a device using a token, according to one embodiment described herein.

FIG. 4 is a flow diagram illustrating a method for verifying firmware on a device using a token, according to one embodiment described herein. As shown, the method 400 begins at block 445, where logic on the device begins installation of the firmware package. As part of such an installation, logic on the device (e.g., a bootloader) could retrieve a private key written to the protected memory of the device (e.g., by or on behalf of the manufacturer of the device) and could use such a key to decrypt the firmware package before attempting to load the firmware package onto the device. Doing so prevents the installation of firmware packages that were not encrypted using a suitable public key (e.g., the public key generated by the manufacturer).

As part of the firmware installation, the device may reboot to load the new version of the firmware. At this point, the bootloader verifies the token provided with the firmware package using the saved token burned into the device by the manufacturer (block 450). In the depicted embodiment, the bootloader compares the two tokens and, upon determining that the tokens are different, the bootloader deletes the downloaded firmware package (block 455). That is, if the bootloader determines that the token corresponding to the downloaded firmware does not match the device-specific token burned onto the device by the manufacturer, the bootloader can determine that the firmware package is not an authorized firmware package and could abort the installation of the firmware. Additionally, in this situation, the bootloader could load a default version of the device firmware onto the device (e.g., from a dedicated area of memory). If instead the bootloader verifies the token received from the runtime orchestrator, the bootloader installs the firmware package (block 460). Doing so helps to prevent the installation of unauthorized (and potentially malicious) firmware on the device.

Technical Description

Figure 5:
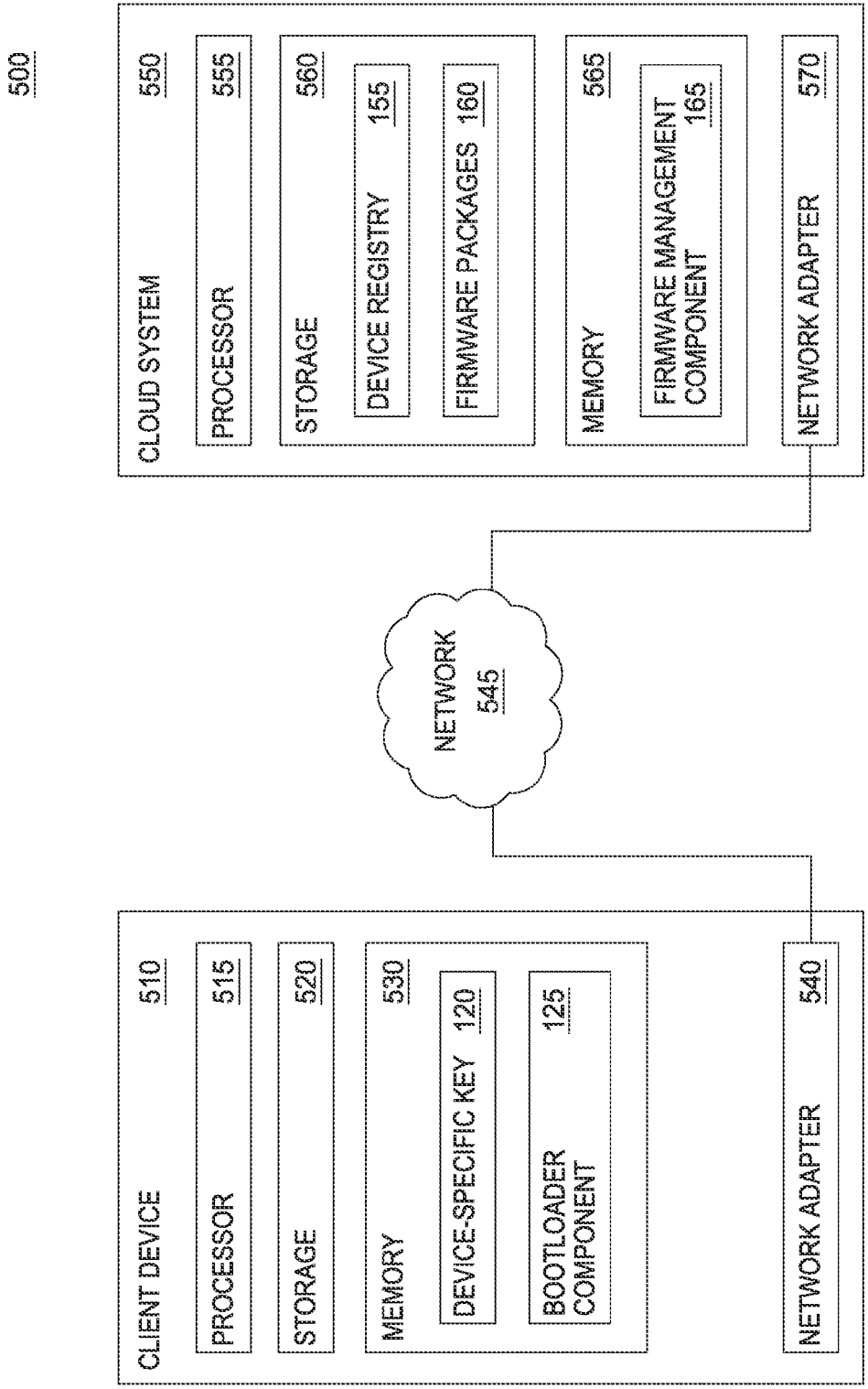
FIG. 5 is a block diagram illustrating a system configured with a firmware management component, according to one embodiment described herein.

FIG. 5 is a block diagram illustrating a system configured with a firmware management component, according to one embodiment described herein. Here, the system 500 includes a client device 510 and a cloud system 550 interconnected via a network 545. In this example, the device 510 includes, without limitation, a processor 515, storage 520, memory 530, and a network adapter 540. Generally, the processor 515 retrieves and executes programming instructions stored in the memory 530. Processor 515 is included to be representative of a single CPU, multiple CPUs, a single CPU having multiple processing cores, GPUs having multiple execution paths, and the like. The memory 530 is generally included to be representative of a random access memory. The network adapter 540 enables the device 510 to connect to the data communications network 555 (e.g., wired Ethernet connection or an 802.11 wireless network).

Further, while the depicted embodiment illustrates the components of a particular interactive device, one of ordinary skill in the art will recognize that interactive devices may use a variety of different hardware architectures. For instance, in one embodiment the controller component logic is implemented as hardware logic. Examples of such hardware logic include, without limitation, an application-specific integrated circuit (ASIC) and a field-programmable gate array (FPGA). Moreover, it is explicitly contemplated that embodiments may be implemented using any device or computer system capable of performing the functions described herein.

Returning to the embodiment depicted in FIG. 5, the memory 530 represents any memory sufficiently large to hold the necessary programs and data structures. Memory 530 could be one or a combination of memory devices, including Random Access Memory, nonvolatile or backup memory (e.g., programmable or Flash memories, read-only memories, etc.). In addition, memory 530 and storage 520 may be considered to include memory physically located elsewhere; for example, on another computer communicatively coupled to the device 510. Illustratively, the memory 530 includes a device-specific key 120 and a bootloader component 125. As discussed above, in addition or in lieu of the device-specific key 120, the memory 530 may contain a unique token for use in identifying authorized firmware packages. Additionally, the device-specific key 120 (and token) may be written to a protected area of memory 530, such that the key 120 (and token) are only accessible by the bootloader of the device 510. The memory 530 may also include an operating system, which generally controls the execution of application programs on the device 510. Examples of the operating system include UNIX, a version of the Microsoft Windows® operating system, and distributions of the Linux® operating system. Additional examples of operating system include custom operating systems for gaming consoles, including the custom operating systems for systems such as the Nintendo DS® and Sony PSP®.

The cloud system 550 includes, without limitation, a processor 555, storage 560, memory 565 and a network adapter 570. Generally, the processor 555 retrieves and executes programming instructions stored in the memory 565. Processor 555 is included to be representative of a single CPU, multiple CPUs, a single CPU having multiple processing cores, GPUs having multiple execution paths, and the like. The memory 565 is generally included to be representative of a random access memory. The network adapter 570 enables the cloud system 550 to connect to the data communications network 545 (e.g., wired Ethernet connection or an 802.11 wireless network).

As shown, storage 560 contains a device registry 155 and firmware packages 160. Additionally, memory 565 includes a firmware management component 165. Generally, the firmware management component 165 is configured to receive device ID and key and/or token information (e.g., from a device manufacturer of the device 510) and to update the device registry 155 using this information. Upon receiving a request for a firmware update from the device 510 having a particular device ID, the firmware management component 165 could retrieve the latest firmware package from the firmware packages 160 in storage 560, and could encrypt the latest firmware package using a key retrieved from the device registry 155 using the particular device ID. The firmware management component 165 could then transmit the encrypted data to the device 510 (e.g., using the network 545).

Upon receiving the encrypted data, the bootloader component 125 could decrypt the encrypted data to recover the firmware package using the device-specific key 120. The bootloader component 125 could then install the firmware package on the device 510. Advantageously, doing so can ensure that only authorized firmware can be installed on the device 510, as the key needed for encrypting the firmware package (i.e., so that the encrypted firmware can be properly decrypted using the device-specific key) can be provided only to authorized parties (e.g., the cloud system 550).

In the preceding, reference is made to embodiments of the invention. However, the invention is not limited to specific described embodiments. Instead, any combination of the following features and elements, whether related to different embodiments or not, is contemplated to implement and practice the invention. Furthermore, although embodiments of the invention may achieve advantages over other possible solutions and/or over the prior art, whether or not a particular advantage is achieved by a given embodiment is not limiting of the invention. Thus, the preceding aspects, features, embodiments and advantages are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

Aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described above with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. Each block of the block diagrams and/or flowchart illustration, and combinations of blocks in the block diagrams and/or flowchart illustration, can be implemented by special-purpose hardware-based systems that perform the specified functions or acts, or combinations of special purpose hardware and computer instructions.

While the foregoing is directed to embodiments of the present invention, other and further embodiments of the invention may be devised without departing from the basic scope thereof, and the scope thereof is determined by the claims that follow.

What is claimed is:

1. An apparatus, comprising:
   a first memory comprising:
      a device-specific token;
      a private key for use in decrypting content; and
      a unique identifier corresponding to the apparatus;
   a second memory comprising a first version of firmware for the apparatus; and
   a controller configured to perform an operation, comprising:
      receiving a first request to perform a firmware update operation for the apparatus;
      transmitting a second request for a second version of firmware to a remote server, the second request specifying the unique identifier corresponding to the apparatus;
      in response to transmitting the second request, receiving an encrypted firmware package from the remote server;
      further in response to transmitting the second request, receiving a second token from the remote server;
      decrypting the encrypted firmware package using the private key; and
      installing the decrypted firmware package on the apparatus, comprising:
         initiating an installation of the decrypted firmware package on the apparatus;
         during the installation of the decrypted firmware package, restarting the apparatus;
         comparing, by a bootloader of the apparatus, the device-specific token with second token received from the remote server; and
         upon determining that the device-specific token and the second token do not match, aborting the installation of the decrypted firmware package on the apparatus.

2. The apparatus of claim 1, wherein the protected memory is a private memory that is only accessible by a bootloader of the apparatus.

3. The apparatus of claim 2, wherein the protected memory is a read only memory, and wherein the protected memory is not accessible by any software application executing on the apparatus.

4. The apparatus of claim 1, wherein the private key is generated according to an asymmetric cryptography technique.

5. The apparatus of claim 1, wherein the private key and the unique identifier are written to the first memory by a manufacturer of the apparatus.

6. A system, comprising:
   a processor; and
   a memory containing a program that, when executed by the processor, performs an operation comprising:
      receiving a request to add a first device to a device registry, the request specifying (i) a unique identifier corresponding to the first device and (ii) a key for use in encrypting data relating to the first device;
      adding the unique identifier and key for the first device to the device registry;
      receiving, from the first device, a request for an updated firmware package, the request specifying the unique identifier corresponding to the first device;
      retrieving the key by accessing the device registry using the unique identifier;
      encrypting a firmware package using the retrieved key; and
      transmitting the encrypted firmware package to the first device for installation.

7. The system of claim 6, wherein the received request further specifies a device-specific token corresponding to the first device, and the operation further comprising:
   transmitting the device-specific token to the first device together with the encrypted firmware package.

8. The system of claim 6, wherein the request to add a first device to a device registry is received from a manufacturer of the device.

9. The system of claim 6, wherein the key is a public key generated according to an asymmetric cryptography technique, and wherein the first device is configured with a corresponding private key for use in decrypting the encrypted firmware package.

10. The system of claim 9, wherein the public key and the private key are both generated by a manufacturer of the first device.

11. A method, comprising:
   generating a public key and a private key for a first device;
   generating a unique identifier corresponding to the first device;
   storing the generated private key onto a first memory of the first device;
   storing the generated unique identifier corresponding to the first device onto a second memory of the first device;
   transmitting a request to add the first device to a device registry to a remote server, the request specifying (i) the unique identifier and (ii) the generated public key; and
   installing control logic on the first device configured to:
      retrieve a private key stored in the first memory;
      decrypt a firmware package received from the remote server, using the retrieved private key; and install the decrypted firmware package on the first device.

12. The method of claim 11, wherein the first memory of the first device is a protected memory that is only accessible by a bootloader of the first device.

13. The method of claim 12, wherein the protected memory is a read only memory, and wherein the protected memory is not accessible by any software application executing on the first device.

14. The method of claim 11, further comprising:
generating a device-specific token corresponding to the first device;
storing the device-specific token onto the first memory of the first device; and
transmitting the device-specific token to the remote server for inclusion in the device registry.

15. The method of claim 14, wherein a bootloader of the first device is configured to compare the device-specific token with second token received from the remote server as part of an installation of a firmware package, and, upon determining that the device-specific token and the second token do not match, is further configured to abort the installation of the firmware package on the first device.

16. The method of claim 12, wherein a controller of the first device is configured to perform an operation, comprising:
receiving a first request to perform a firmware update operation for the first device, wherein a first version of firmware is installed on the first device;
transmitting a second request for a second version of firmware to the remote server, the second request specifying the unique identifier corresponding to the first device;
in response to transmitting the second request, receiving an encrypted firmware package from the remote server;
decrypting the encrypted firmware package using the private key burned onto a first memory of the first device; and
installing the decrypted firmware package on the first device.

17. The method of claim 11, wherein logic on the remote server is configured to perform an operation comprising:
receiving the request to add the first device to a device registry;
adding the unique identifier and key for the first device to the device registry;
receiving, from the first device, a request for an updated firmware package, the request specifying the unique identifier corresponding to the first device;
retrieving the key by accessing the device registry using the unique identifier;
encrypting a firmware package using the retrieved key; and
transmitting the encrypted firmware package to the first device for installation.

18. The method of claim 11, wherein the public key and the private key are generated according to an asymmetric cryptography algorithm.

* * * * *